United States Patent
Olson et al.

(10) Patent No.: US 11,231,115 B2
(45) Date of Patent: Jan. 25, 2022

(54) SINGLE ACTUATOR MULTIPLE POSITION APPLIANCE DIVERTER VALVE

(71) Applicant: ILLINOIS TOOL WORKS INC., Glenview, IL (US)

(72) Inventors: Jonathan H. Olson, Sussex, WI (US); Michael S. Osvatic, Waukesha, WI (US)

(73) Assignee: Illinois Tool Works Inc., Glenview, IL (US)

( * ) Notice: Subject to any disclaimer, the term of this patent is extended or adjusted under 35 U.S.C. 154(b) by 787 days.

(21) Appl. No.: 16/070,616

(22) PCT Filed: Feb. 6, 2017

(86) PCT No.: PCT/US2017/016646
§ 371 (c)(1),
(2) Date: Jul. 17, 2018

(87) PCT Pub. No.: WO2017/139213
PCT Pub. Date: Aug. 17, 2017

(65) Prior Publication Data
US 2021/0207730 A1    Jul. 8, 2021

Related U.S. Application Data

(60) Provisional application No. 62/293,988, filed on Feb. 11, 2016.

(51) Int. Cl.
*F16K 11/074*    (2006.01)
*F16K 1/24*    (2006.01)
(Continued)

(52) U.S. Cl.
CPC .............. *F16K 11/074* (2013.01); *F16K 1/24* (2013.01); *F16K 11/078* (2013.01);
(Continued)

(58) Field of Classification Search
CPC ........ F16K 1/24; F16K 11/074; F16K 11/078; F16K 31/043; F16K 39/045
(Continued)

(56) References Cited

U.S. PATENT DOCUMENTS 3,620,255 A * 11/1971 Stillman .................... F16K 3/10
137/625.45
4,492,247 A * 1/1985 Lockwood ........... A01G 25/162
137/119.03
(Continued)

FOREIGN PATENT DOCUMENTS

EP    0287457 A1    10/1988
EP    2816270 A2 * 12/2014    ............ F16K 11/074
FR    2979966 A1 *  3/2013    ......... F02D 13/0276

OTHER PUBLICATIONS

Elisabeth Eitel for Machine Design, "Basics of Rotary Encoders", May 7, 2014, https://www.machinedesign.com/automation-iiot/sensors/article/21831757/basics-of-rotary-encoders-overview-and-new-technologies, downloaded on May 18, 2021 (Year: 2014).*
(Continued)

*Primary Examiner* — Seth W. Mackay-Smith
(74) *Attorney, Agent, or Firm* — Boyle Fredrickson, S.C.

(57) ABSTRACT

A diverter valve for an appliance such as a washing machine or the like provides a valve plate that can be moved by a DC motor both rotationally about an axis and axially along the axis to allow the valve plate to be retracted from engagement with a valve seat before rotation and reengaged after rotation permitting operation with a low-power DC motor.

20 Claims, 8 Drawing Sheets

(51) Int. Cl.
*F16K 11/078* (2006.01)
*F16K 31/04* (2006.01)
*F16K 37/00* (2006.01)
*F16K 39/04* (2006.01)

(52) U.S. Cl.
CPC ........ *F16K 31/043* (2013.01); *F16K 37/0066* (2013.01); *F16K 39/045* (2013.01)

(58) Field of Classification Search
USPC .................................................. 251/164, 188
See application file for complete search history.

(56) References Cited

U.S. PATENT DOCUMENTS

| | | | | |
|---|---|---|---|---|
| 4,570,663 | A * | 2/1986 | Gould | F16K 11/166 |
| | | | | 137/119.07 |
| 4,817,656 | A | 4/1989 | Gould | |
| 5,542,644 | A * | 8/1996 | Smith | F16K 5/185 |
| | | | | 251/163 |
| 5,769,392 | A * | 6/1998 | Jeon | F16K 31/502 |
| | | | | 251/188 |
| 7,337,790 | B2 * | 3/2008 | Ha | A47L 15/4221 |
| | | | | 134/184 |
| 7,866,344 | B2 * | 1/2011 | Webster | F16K 11/074 |
| | | | | 137/625.21 |
| 10,088,849 | B2 * | 10/2018 | Hurst | F16K 31/385 |
| 2007/0125429 | A1 * | 6/2007 | Kandl | F16K 31/26 |
| | | | | 137/389 |
| 2012/0060876 | A1 * | 3/2012 | Tarr | A47L 15/0023 |
| | | | | 134/56 R |
| 2017/0071441 | A1 * | 3/2017 | Durham | F16K 11/074 |
| 2017/0071443 | A1 * | 3/2017 | Boyer | F16K 11/074 |

OTHER PUBLICATIONS

Anaheim Automation, "Stepper Gearmotors", logged Aug. 4, 2014 by the Internet Archive/Wayback Machine, https://web.archive.org/web/20140804134806/http://anaheimautomation.com/products/stepper/stepper-gearmotors.php?tID=77&pt=t&cID=51, downloaded on May 18, 2021 (Year: 2014).*

* cited by examiner

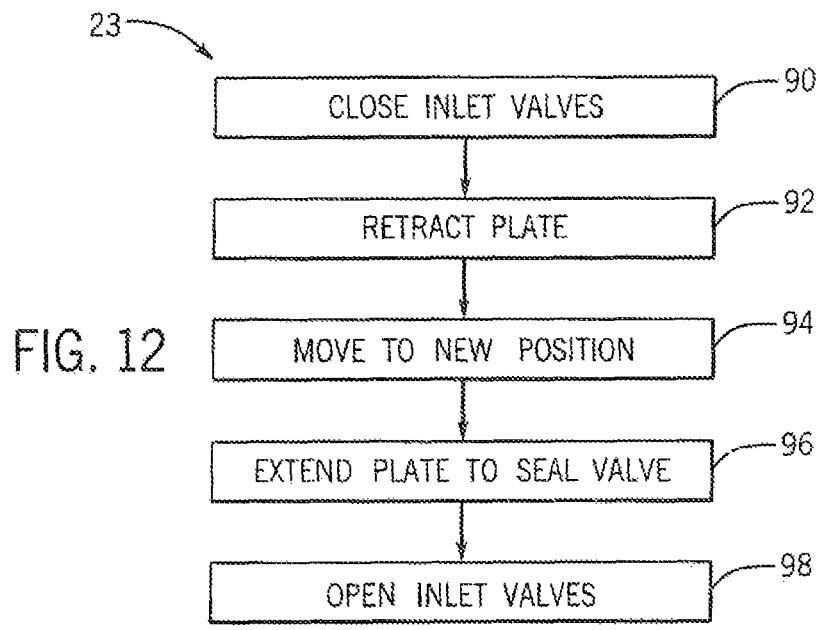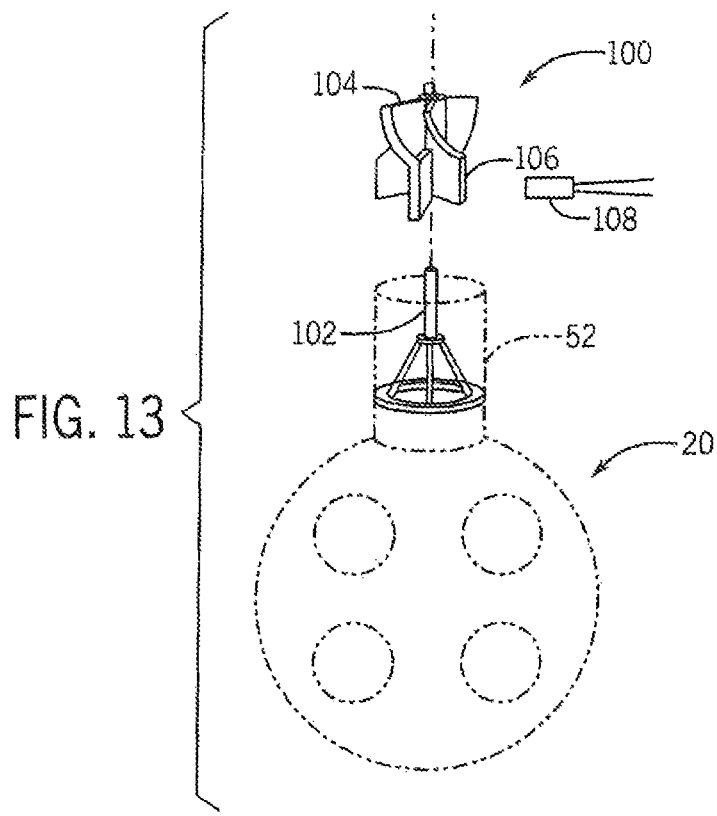

SINGLE ACTUATOR MULTIPLE POSITION APPLIANCE DIVERTER VALVE

This application claims the benefit of US provisional 62/293,988 filed Feb. 11, 2016 and hereby incorporated by reference.

FIELD OF THE INVENTION

The present invention relates to clothes washing machines and the like and specifically to a diverter valve that may direct incoming water to a variety of locations in the appliance for activation of special cleaning materials and the like.

BACKGROUND OF THE INVENTION

Modern appliances can provide improved efficiency in water usage and cleaning material usage by timing the introduction of cleaning materials at different points during the cycle. Handling different cleaning materials, such as soaps, bleaches, and softeners, is most conveniently done by preloading the materials into dedicated chambers which are then flushed by the incoming wash water directed through the chamber at specific times. Control of multiple streams of wash water for this purpose can be performed by a diverter valve array typically being multiple solenoid-driven valves receiving water from a common conduit and directing it along multiple different pathways. The solenoids of the valves used for this purpose usually employ line voltages to actuate requiring additional measures to be taken to ensure a high degree of electrical insulation and isolation from the water supply. The use of different independently operable solenoids introduces multiple possible single point failures which could independently lead to flooding. These valve systems are also large and relatively costly.

Because the diverter valve can be used for the release of cleaning materials, it is important that the diverter valve operate to fully block water flow between those outlets not in use so as to prevent minor water flow from releasing cleaning materials prematurely.

SUMMARY OF THE INVENTION

The present invention provides a multi-way diverter valve (for example, providing for multiple selectable different water flow paths) using a single actuator and in particular a low-power, energy-efficient DC motor. The valve is provided by a valve plate having an orifice that may be rotated into alignment with one of multiple outlet ports. Low leakage is obtained from the valve plate while still permitting operation using a low power DC motor, by a coupling that provides both rotational and axial movement of the valve plate. In this way the valve plate may be moved away from engagement with the multiple outlet ports prior to rotation to reduce frictional contact, and then the valve plate may be rotated and then returned back into a compressive sealing relationship with the multiple outlet ports.

The ability to construct a single multiway diverter valve eliminates multiple points of single point failure that are present using multiple solenoid valves on a manifold.

Specifically, the invention provides a water diverter valve for use in an appliance such as a washing machine and provides a housing having a water inlet and multiple water outlet ports. The diverter valve provides a DC electric motor communicating with a valve plate rotatable about an axis and providing an orifice allowing water flow between the water inlet port and one of the multiple water outlet ports depending on a rotated position of the valve plate. The DC electric motor and valve plate are coupled to move the valve plate in rotation with rotation of the DC electric motor to align the water inlet port with different of the multiple water outlet ports and to move the valve plate axially toward and away from the multiple water outlet ports with rotation of the DC electric motor in a first and second direction.

It is thus a feature of at least one embodiment of the invention to provide a water diverter valve that offers good sealing while providing low rotational friction suitable for actuation with a low-power, energy-efficient DC motor. By providing separate rotation and axial movement of the valve plate as it is moved between positions, low leakage can be obtained together with low actuation forces.

The coupling between the motor and the valve plate may include an axial shaft formed by threaded inter-engaging axially-displaced shaft portions.

It is thus a feature of at least one embodiment of the invention to provide a threaded coupling shaft that allows both rotation and axial movement of the valve plate with a single DC motor.

The valve plate may include an elastomeric gasket positioned between the valve plate and the multiple water outlet ports and sealing against water outlet ports with rotation of the DC electric motor in the first direction.

It is thus a feature of at least one embodiment of the invention to provide a good sealing surface by using a compressible compliant material without the high resistance to rotation which would otherwise attend to friction associated with the elastic compression of the gasket between sliding surfaces.

The motor may be a sub-fractional horsepower DC electric motor having an operating power of less than 25 watts and preferably less than 10 Watts.

It is thus a feature of at least one embodiment of the invention to provide a diverter valve that can make use of a highly energy-efficient, small wattage DC motor.

The water diverter valve may include a reduction gear assembly between the DC motor and the valve plate.

It is thus a feature of at least one embodiment of the invention to provide sufficient mechanical advantage that with the normal holding torque, a DC motor can retain the valve components in position even without power applied to the DC motor.

The water diverter valve may include an encoder communicating with the valve plate to provide electrical signals indicating a position of the valve plate.

It is thus a feature of at least one embodiment of the invention to permit sophisticated feedback control of the valve plate to implement the two-stage axial rotation of control of the valve plate with a single actuator. It is another feature of at least one embodiment of the invention to enable more sophisticated failure detection attendant to knowing the actual position of the valve.

The encoder may provide a unique encoder signal at multiple different rotated positions of the valve plate to provide an absolute indication of valve plate position.

It is thus a feature of at least one embodiment of the invention to eliminate the need for a "homing operation" where the valve plate position is determined by cycling through each of the possible locations of the valve plate in the event of a power failure.

The encoder may be attached to a side of a coupling between the motor and the valve plate including inter-engaging axially-threaded portions closest to the DC electric motor.

It is thus a feature of at least one embodiment of the invention to provide an indication of motor position distinct from valve plate position as can facilitate a sophisticated cycling of motor operation for the rotating and axial movement of the valve plate.

The encoder may provide a set of movable electrical contacts rotating with the valve plate communicating with corresponding different stationary electric contacts on the housing and stationary with respect to the valve plate to provide a unique encoder system based on electrical communication between the movable and stationary electrical contacts.

It is thus a feature of at least one embodiment of the invention to provide a simple and low-cost encoder suitable for use in an appliance.

The inlet port of the water diverter valve may include a flow sensor.

It is thus a feature of at least one embodiment of the invention to permit monitoring of water flow, for example, to better control water volumes during variations in water pressure.

The flow sensor may be a turbine rotating with flow through the inlet port communicating with a turbine rotation sensor.

It is thus a feature of at least one embodiment of the invention to provide an accurate but low-cost flow sensor suitable for appliances.

The water diverter valve may further include a check valve positioned between the water inlet and the valve plate operating to be biased toward closure with water flow into the water inlet to the valve plate.

It is thus a feature of at least one embodiment of the invention to provide a backup against failure of upstream valves. The check valve may be overridden by the valve plate once water flow is desired.

In this regard the valve plate may provide cam elements communicating with the check valve to open the check valve with rotation of the valve plate such that the orifice is aligned with one of the multiple water outlet ports and to permit the check valve to close with rotation of the valve plate such that the orifice is between multiple water outlet ports.

It is thus a feature of at least one embodiment of the invention to provide resistance to upstream valve failure without the need for additional actuators other than the DC motor used for rotation of the valve plate Other features and advantages of the invention will become apparent to those skilled in the art upon review of the following detailed description, claims and drawings in which like numerals are used to designate like features.

BRIEF DESCRIPTION OF THE DRAWINGS

FIG. 12 is a flowchart of a program executed by a controller communicating with the diverter valve for implementing the steps shown in FIGS. 8-11; and FIG. 13 is a fragmentary phantom view of an inlet port of the diverter valve including a turbine for monitoring water flow.

Figure 1:
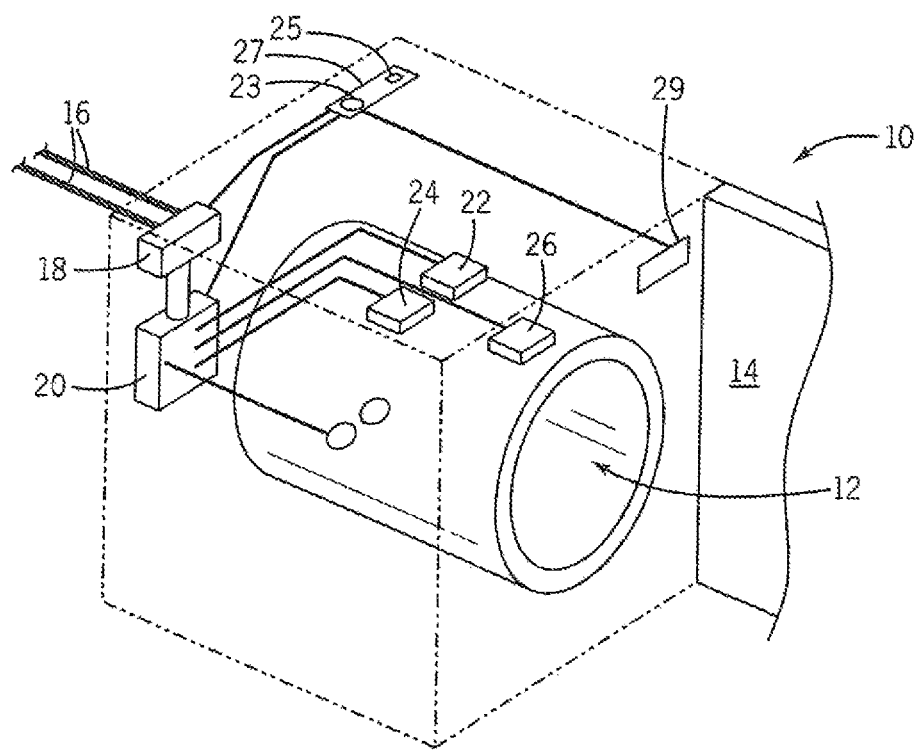
FIG. 1 is a phantom view of a washing machine holding the diverter valve of the present invention for connection between upstream valves receiving pressurized water and multiple water flow points including dispenser chambers and a washing machine cavity.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now to FIG. 1, an appliance 10, such as a frontloading washing machine, may provide for a wash tub 12 coverable by a door 14 (shown in fragment). A source of hot and cold water 16, for example, from household plumbing, may be received by a mixer valve 18 assembly to provide a mixed water outlet passing to a diverter valve 20.

The diverter valve 20 may direct the received water to any of a number of endpoints including a bleach compartment 22, a detergent compartment 24, softener compartment 26, or the tub 12. The mixer valve 18 and diverter valve 20 may be controlled by an appliance contoller 27, for example, the appliance controller 27 including a computer processor 25 executing a memory-stored program 23 as will be discussed below. The appliance controller 27 may receive input from a control panel 29, for example, having buttons for activation by the user and may provide outputs to that panel for visual display, for example, error codes and like.

Figure 2:
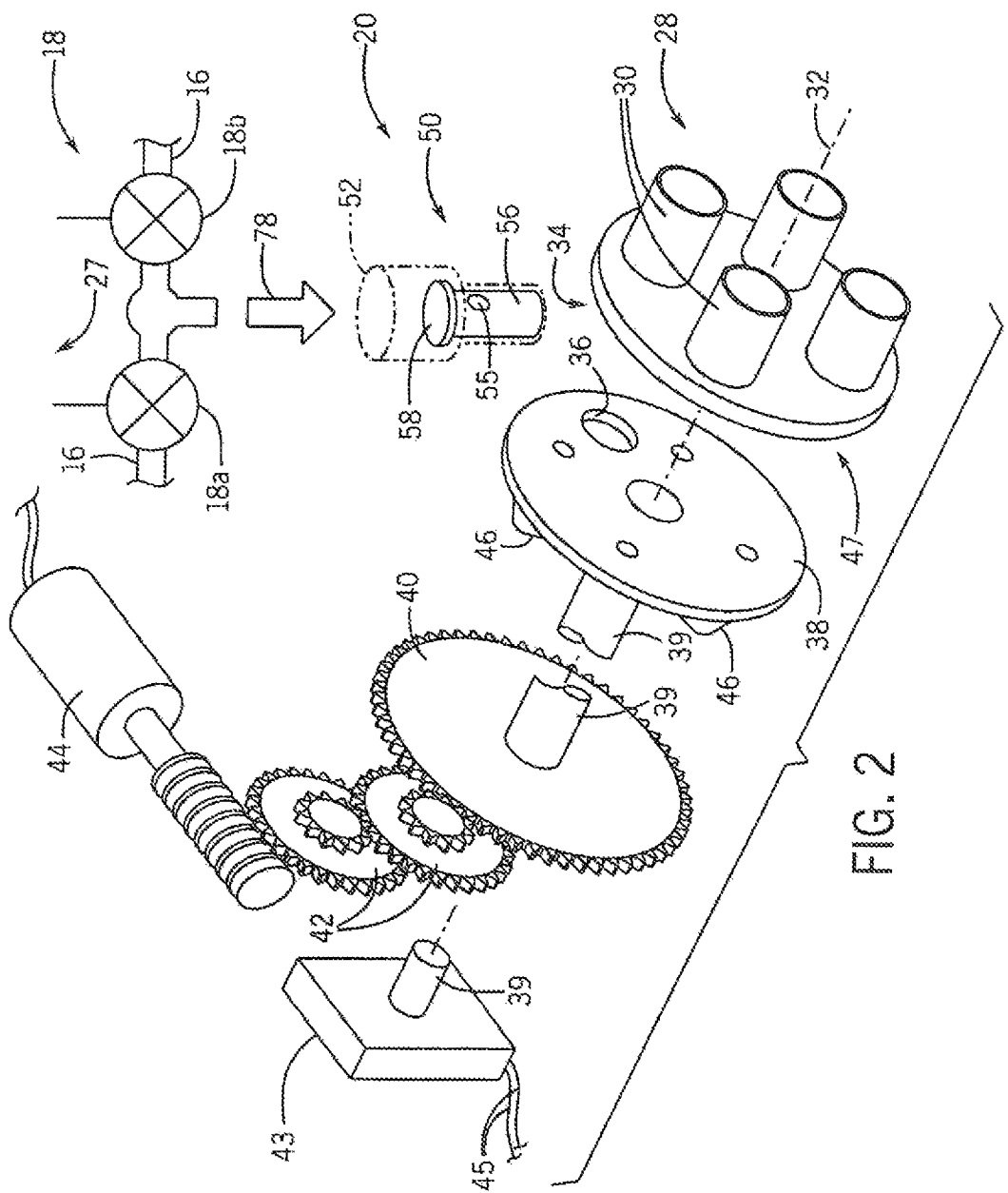
FIG. 2 is an exploded perspective view of the principal components of the diverter valve of FIG. 1 showing a valve plate having pins for interacting with an upstream shut-off valve.

Referring now to FIG. 2, the diverter valve 20 may provide for a manifold assembly 28 having four different diverter outlet pipes 30 directed generally parallel to an axis 32. Each of the outlet pipes 30 may separately lead to one of the endpoints discussed above.

A rear face 34 of the manifold assembly 28 provides for a valve seat plate being generally a planar disk having four openings (valve seats 47 shown in FIG. 3) connected to the respective outlet pipes 30 that may align and move out of alignment with the valve opening 36 on a rotatable valve plate 38. Valve plate 38 may have a front face generally parallel to the rear face 34 of the manifold assembly 28 to fit there against and provides a forward facing planar surface that may slide in rotation against the rear face 34 of the manifold assembly 28. In this way the valve opening 36 may successively align with each of the outlet pipes 30 and its respective valve seat 47 and water may be directed through that particular outlet pipe 30. In addition, the valve opening 36 may be positioned between outlet pipes 30 to block water flow through any of the outlet pipes 30.

The valve plate 38 is mounted for rotation about the axis 32 as attached through shaft 39 to a drive gear 40 having a diameter substantially equal to the diameter of the valve plates 38 to provide improved torque in turning the valve plate 38. The drive gear 40 may be attached through various step-down gears 42 as is understood in the art to a DC electric motor 44 so that the DC electric motor may generate sufficient torque to rotate the valve plate 38 when operating at a nominal voltage of 12 volts or less. The DC electric motor 44 may be operated in either of two directions by a shifting of polarity on the motor leads. Ideally the DC electric motor 44 is a fractional horsepower motor using less than 25 watts and preferably less than 10 watts of electrical power during use and no power during the idle state.

An encoder 43 may be attached to a common shaft 39 that is connected to drive gear 40 and valve plate 38 so as to provide rotational position signals out of electrical conductors 45 indicating the absolute rotational position of the valve plate 38 with respect to the rear face 34 of the manifold assembly 28. These position signals may pass to the appliance controller 27 (shown in FIG. 1) to provide feedback as to the location in rotation of the valve opening 36. In this way, the motor 44 may be operated by the appliance controller 27 in a closed loop to move the valve opening 36 reliably between any of the outlet pipes 30 and its respective valve seat 47. In addition, failure of movement of the valve plate 38, as detected by the encoder 43 and after a predetermined time when motor 44 has been energized by the appliance controller 27, may be detected by the appliance controller 27 as an error, for example, to shut down water flow at the mixer valve 18 and to provide an error warning at the control panel 29.

Figure 3:
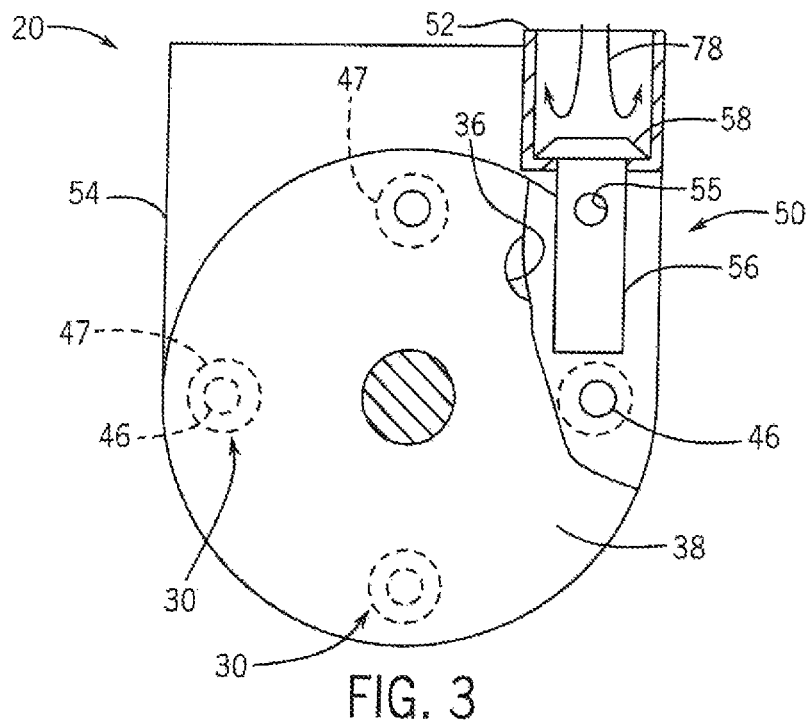
FIG. 3 is a fragmentary cross-sectional view of the assembled diverter valve during movement of the valve plate showing the shut-off valve in the closed position to protect against upstream valve failure.

Referring to FIGS. 2 and 3, the rear face of the valve plate 38 may include rearwardly extending cam pins 46 extending parallel to axis 32 and spaced regularly about the axis 32 at an angular separation matching that of the outlet pipes 30 but displaced therefrom.

An upstream water check valve 50 may communicate with a water inlet 52; the latter attached generally to a housing 54 of the diverter valve 20 and connected to the mixer valve 18 to receive water flow there from. The mixer valve 18 may include separate hot and cold solenoid valves 18a and 18 communicating with the controller 27 to be controlled thereby.

In one embodiment, the check valve 50 provides a tube 56 open at its lower end (as depicted) and also open through a sidewall port 55 near its upper end. An upper end of the tube 56 above the sidewall port 55 is blocked and attaches to an elastomeric plug 58 of greater diameter than the tube 56 that will generally seal against an opening between the water inlet 52 and the interior of the housing 54 behind the valve plate 38 with respect to the manifold assembly 28, absent other forces on the tube 56. The sealing may be initiated by gravity acting on the tube 56 in the shown orientation or the force of water flow through the water-inlet 52 causing the plug 58 to press against the opening in the bottom of the water inlet 52 where it is then held by water pressure. The plug 58 may then be understood to operate in the manner of a check valve responding to one direction of flow. In the sealing position, water pressure is blocked from the interior of the housing.

Figure 4:
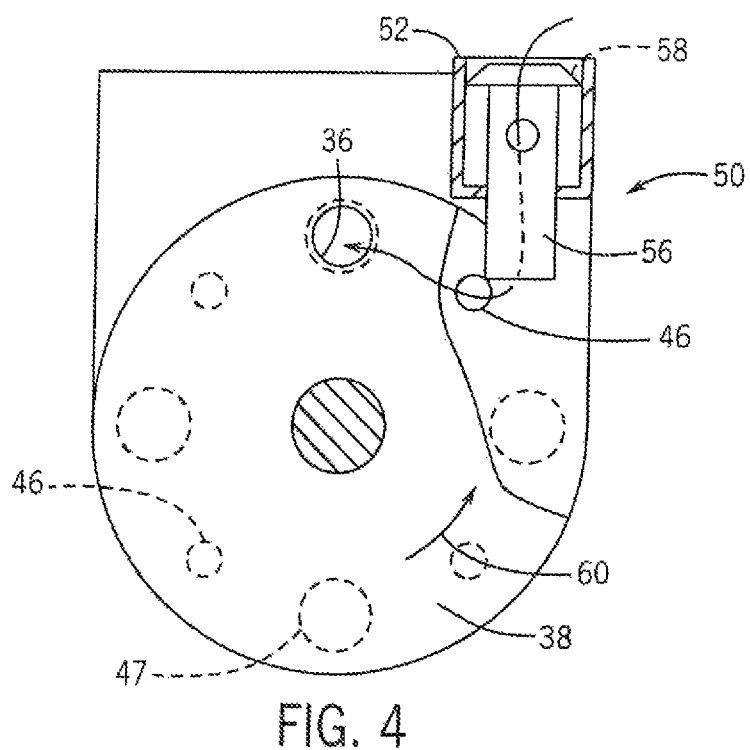
FIG. 4 is a fragmentary cross-sectional view similar to that of FIG. 3 showing an opening of the shut-off valve when the valve plate is aligned with a respective valve seat to permit water flow when the upstream valve is opened.

Referring now to FIG. 4, as will be discussed further below, when it is desired to change the outlet pipe 30 through which water flows, the mixer valve 18 upstream from the water inlet 52 may be closed by the controller 27 and the valve plate 38 may be rotated in the counterclockwise direction shown by arrow 60. When the valve opening 36 is not aligned with a valve seat 47, the cam pins 46 do not engage a lower surface of the tube 56 allowing it operate in a check valve fashion as shown in FIG. 3 preventing water flow into the diverter valve 20. This position may be used to stop all water flow through the diverter valve 20, the check valve 50 operating to provide redundant control of water flow together with the mixer valve 18.

In contrast, when the valve opening 36 aligns with a valve seat 47, a cam pin 46 engages the lower surface of the tube 56 pushing it upward to displace the plug 58 from the opening in the water inlet 52 allowing the inflow of water into the housing 54 when the mixer valve 18 is open to direct water through one of the valve seats 47 associated with a outlet pipes 30. This water flow flows through the valve plate 38 and then flows out of the diverter pipe 37 aligned with the opening 36.

Figure 5:
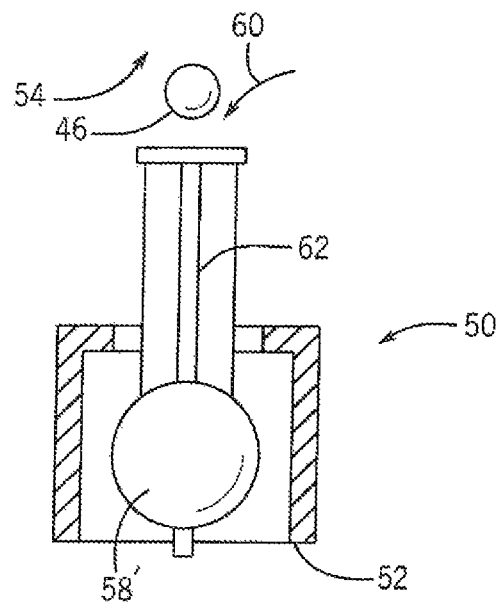
FIG. 5 is a cross-sectional view of an alternative shut-off valve employing buoyancy rather than gravity or water pressure for closure bias.

Referring now to FIG. 5, in an alternative embodiment, when the water inlet 52 faces downward, the check valve 50 may employ a buoyant elastomeric plug 58' functioning in a manner similar to plug 58 of FIGS. 2, 3, and 4 to seal the opening in the water inlet 52 against water flowing into the housing 54 when there is no countervailing force on a stem 62 extending upward from the plug 58'. This latter stem 62 is positioned to interact with pins 46 in a manner similar to that described with respect to FIGS. 3 and 4 with rotation per arrow 60 of the valve plate 38 to open the check valve 50. The fundamental difference between the check valve 50 of FIG. 4 and FIG. 5 is that the closure of the plug 58 against the opening in the water inlet 52 is assisted by buoyancy rather than by gravity.

Figure 6:
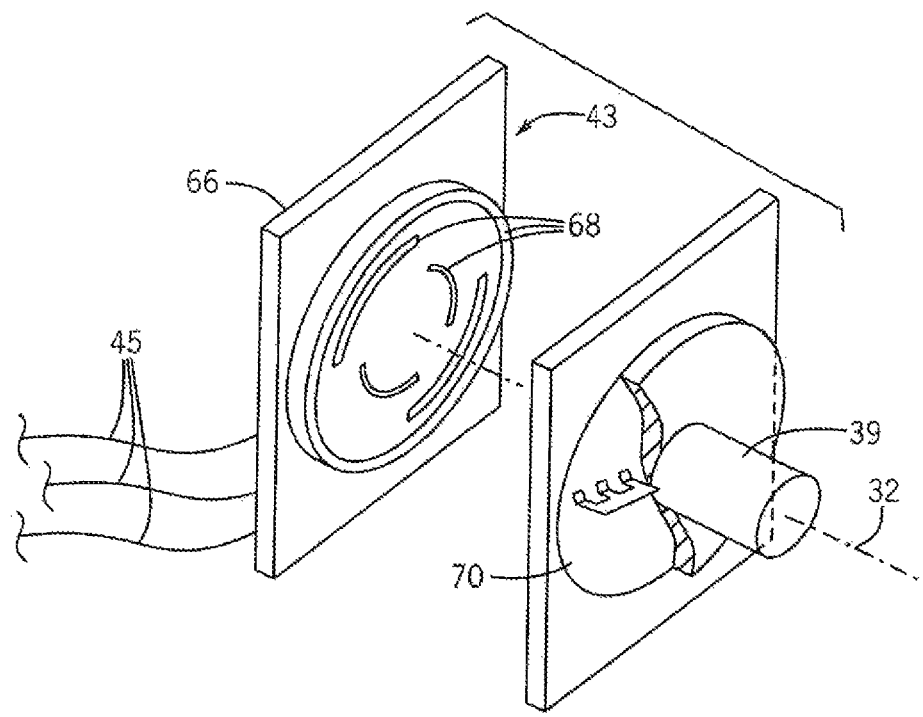
FIG. 6 is an exploded view of one embodiment of an encoder using a rotary electrical switch.

Referring now to FIG. 6, the encoder 43, in one embodiment, may provide a printed circuit board 66 having circular traces 68 around axis 32 to be interconnected by means of metallic spring contact fingers 70 with rotation of the encoder shaft 39 attached to the gear 40 and valve plate 38 as described above. In this way electrical signals can be sent on electrical conductors 45 to the appliance controller 27 (shown in FIG. 1) allowing the appliance controller 27 to sense the position of the shaft 39 and control the motor 44 for advancing the position of the opening 36 and then stopping it in the correct position to align with one of the valve seats 47. The encoder 43 thus formed is an absolute encoder providing a unique signal to the appliance controller 27 depending on the rotated position of the shaft 39. This allows the controller 27 to control the operation of the diverter valve 20 in closed loop fashion limiting the need for unnecessary cycling of the motor in order to find a home position, for example, when power is lost temporarily erasing the memory of the controller 27.

Figure 7:
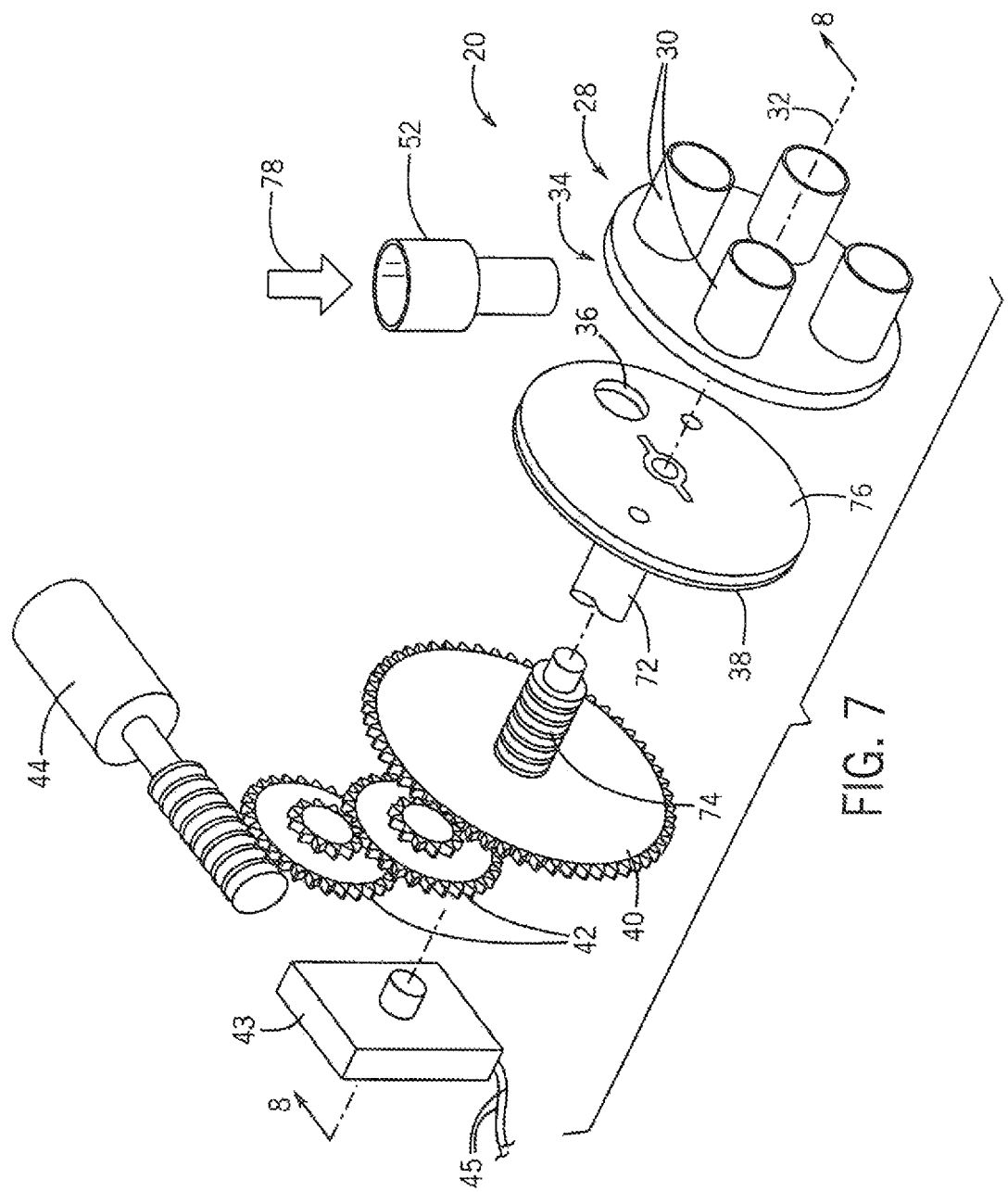
FIG. 7 is a figure similar to FIG. 2 showing an alternative embodiment of the invention using a helical drive mechanism to retract the valve plate to reduce friction between the valve plate and the valve seat during relative rotation.

Referring now to FIG. 7, in an alternative embodiment, improved sealing between the valve plate 38 and the rear face 34 of the manifold assembly 28 may be provided through a dual action of the valve plate 38 in rotation about axis 32 and in translation along the axis 32 in one of two directions. This translation allows the valve plate 38 to be pulled away from the rear face 34 of the manifold assembly 28 prior to rotation to reduce friction and then after rotation for the valve plate 38 to be compressed against the rear face 34 of the manifold assembly 28 to provide improved sealing. This dual action is provided, while using a single DC motor 44, by means of a threaded engagement between an internally threaded shaft 72 extending rearward from the valve plate 38 and a correspondingly externally threaded shaft 74 extending forwardly from the gear 40. In this embodiment, the encoder 43 may attach directly to the gear 40 to sense the position of the gear 40 (and the position of the valve plate 38 only indirectly) for improved control.

Figure 8:
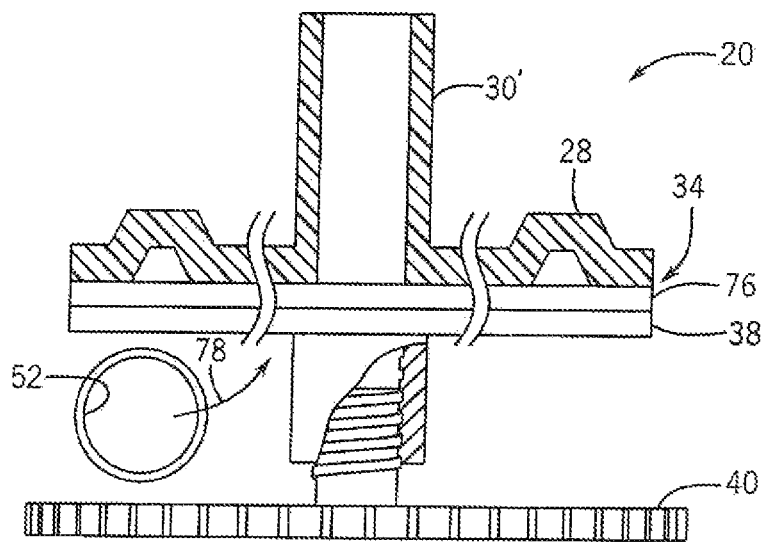
FIG. 8 is a cross-sectional view along line 8-8 of FIG. 7 showing the valve plates sealed against the valve seat with water diverted to an outlet port other than that illustrated.

Referring now to FIG. 8, in this embodiment, the front surface of the valve plate 38 may provide an elastomeric gasket 76 that compresses with movement of the valve plate 38 toward the rear face 34 of the manifold assembly 28 to create an improved seal. As shown, the valve plate 38 is in the sealed position with respect to the rear face 34, and water entering from the water inlet 52 behind the valve plate 38 exits through the opening 36 aligned with one of the outlet pipes 30 not visible in this figure.

Figure 9:
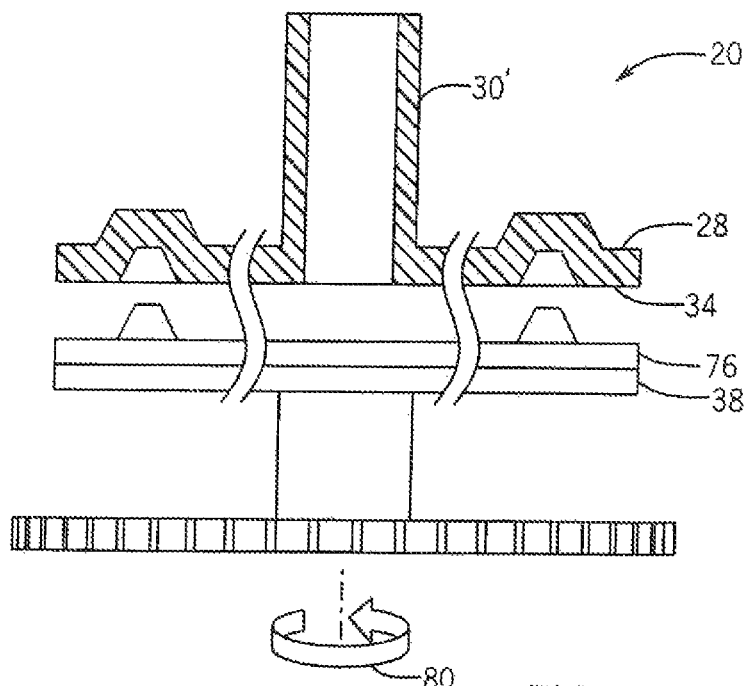
FIG. 9 is a figure similar to FIG. 8 showing a motion of the helical actuator pulling the valve plate away from the valve seat for rotation.

When it is desired to move the opening 36 to a new outlet pipe 30', gear 40 is forward rotated as indicated by arrow 80 which causes the helical threaded engagement between shafts 74 and 72 to pull the valve plate 38 and gasket 76 away from the rear face 34 of the manifold assembly 28 to allow the relative motion between the two without high sliding forces. This retraction is shown in FIG. 9.

Figure 10:
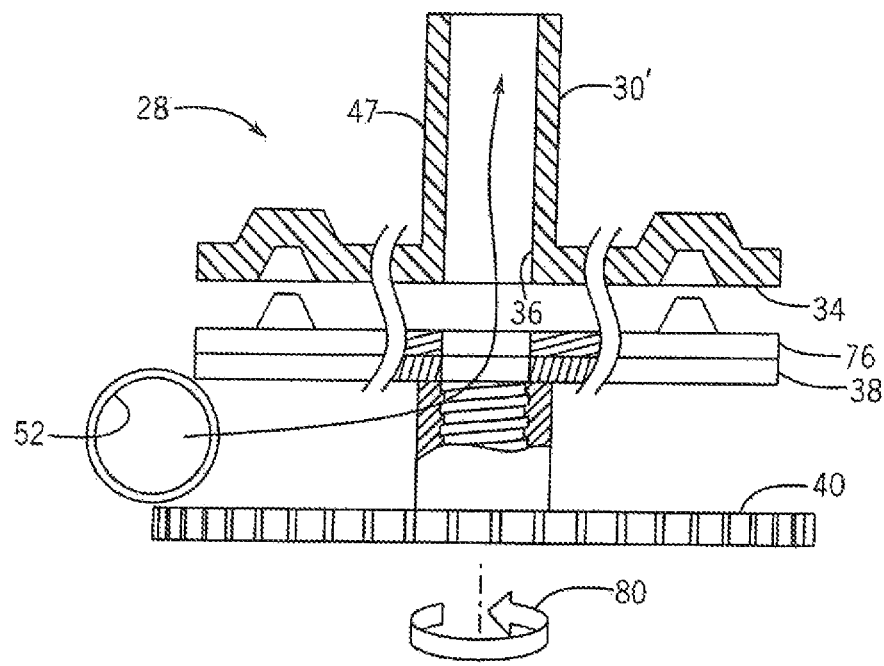
FIG. 10 is a figure similar to FIGS. 8 and 9 showing rotation of the valve plate for alignment of a valve opening with the cross-sectioned outlet port.
Figure 11:
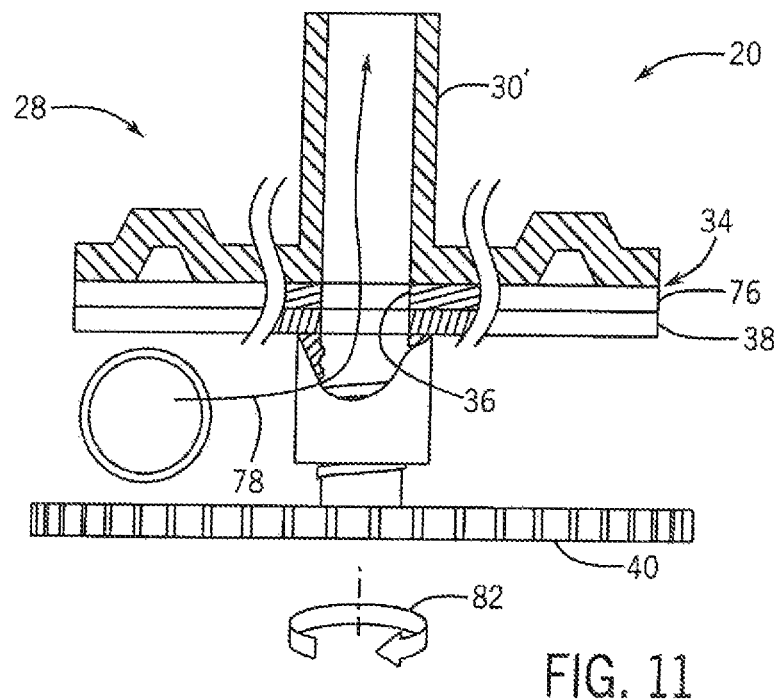
FIG. 11 is a figure similar to FIGS. 8, 9, and 10 showing a reversing of the helical actuator to press the valve plate against the valve seat for sealing.

Continued forward rotation in the forward direction indicated by arrow 80, as shown in FIG. 10, causes the rotation of the valve plate 38 and the gasket 76 until opening 36 is aligned with outlet pipe 30' depicted in cross-section. At this point, as sensed by the appliance controller 27, the appliance controller 27 reverses the polarity on the DC motor 44 to provide a slight reversing of the direction of the motor shown by arrow 82. This reversing then causes re-engagement of the valve plate 38, gasket 76, and rear face 34 of the manifold assembly 28 allowing flow through the outlet pipe 30' but blocking flow through the other outlet pipes 30. By withdrawing and then rotating the valve plate 38, a low-power DC motor may successfully provide switching of high water pressures. Retrograde rotation of the valve plate 38 (e.g., the direction of arrow 82) during this reversal of the polarity on the DC motor 44 can be prevented by a slight frictional contact between the valve plate 38 and other elements or by a ratchet or other mechanism understood in the art.

It will be appreciated that this sealing operation may also be performed when the opening 36 is not aligned with any outlet pipe 30 so as to essentially seal the diverter valve 20 against the flow of water through any of the outlet pipes 30.

Referring now to FIG. 12, the above-described motion of the valve plate 38 during movement to various positions may be under the control of the controller 27 executing a stored program 23. In that program as indicated by process block 90, the controller 27 first closes the upstream valves of mixer valve 18 to remove pressure on the various components of the diverter valve 20. As indicated by process block 92 forward motion of the DC motor 44 and gear 40 retracts the valve plate 38 from the rear face 34. The amount of forward motion may be controlled by the controller 27 timing the application of power to the motor 44 or using the encoder 43 in feedback control.

Per process block 94, continued forward motion of the DC motor 44 and gear 40 causes the valve plate 38 to cease retraction, for example, as a result of limited thread length in the shafts 74 and 72 and to begin rotation to the next position desired by the controller 27. When that position is reached, for example, as determined by the controller 27 monitoring the encoder 43, the direction of the DC motor 44 is reversed causing the valve plate 38 to compress against the rear face 34 squeezing the gasket 76 therebetween to provide a strong seal as indicated by process block 96. This sealing position is retained when power is no longer applied to the motor 44 because of the high degree of mechanical advantage provided by the gears 42 which essentially amplifies the holding torque of the unpowered DC motor 44.

At process block 98, if the new position of the valve plate 38 is such that the opening 36 aligns with one of the outlet pipes 30, the mixer valve 18 may then again be opened to provide a desired water flow for a determined period of time or volume.

Referring now to FIG. 13, in one embodiment, the water inlet 52 may incorporate a turbine element 100 mounted within the water inlet 52 on a shaft assembly 102 allowing the passage of water thereby into the housing 54. The turbine element 100 may have helically spiraled vanes 104 to cause it to rotate with passage of water through the inlet 52, and a magnet or similar feature 106 may be mounted on the turbine element 100 to allow its rotation to be measured, for example, by Hall effect sensor 108 stationarily attached to the water inlet 52. In this way a flow rate of water into the diverter valve 20 may be measured and relayed to the controller 27, for example, to provide for controlled flow of water into a dispenser or the like sufficient to dispense material from the bleach compartment 22, detergent compartment 24, or softener compartment 26 without unnecessary water waste.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A water diverter valve for use in an appliance comprising:
    a housing providing a water inlet and multiple water outlet ports;
    a shut-off valve at a first location proximate the water inlet and that defines an open position and a closed position with the shut-off valve arranged with respect to the water inlet port to selectively allow or block water flow through the water diverter valve when in the open and closed positions, respectively; a DC electric motor;
    a valve plate at a second location proximate the water outlet ports and rotatable about an axis and providing an orifice allowing water flow between the water inlet port and one of the multiple water outlet ports depending on a rotated position of the valve plate; and
a coupling between the DC electric motor and the valve plate operating to move the valve plate in rotation with rotation of the DC electric motor to align the water inlet port with another one of the multiple water outlet ports and to move the valve plate axially toward and away from the multiple water outlet ports with rotation of the DC electric motor in a first and second direction;

wherein:
the DC electric motor may rotate the valve plate and control its sealing against the multiple water outlet ports; movement of the valve plate corresponds to actuation the shut-off valve so that;
the shut-off valve is in the open position and allows water flow through the water diverter valve when the valve plate orifice and any one of the multiple water outlet ports are aligned;
the shut-off valve is in the closed position and blocks water flow through the water diverter valve when the valve plate orifice and the multiple water outlet ports are not aligned.

2. The water diverter valve of claim 1 wherein the coupling includes an axial shaft formed by threaded inter-engaging axially-displaced shaft portions.

3. The water diverter valve of claim 1 wherein the valve plate includes an elastomeric gasket positioned between the valve plate and the multiple water outlet ports and sealing against water outlet ports with rotation of the DC electric motor in the first direction.

4. The water diverter valve of claim 1 wherein the motor is a sub-fractional horsepower DC electric motor having an operating power of less than 25 watts.

5. The water diverter valve of claim 4 further including a reduction gear assembly between the DC motor and the valve plate.

6. The water diverter valve of claim 1 further including an encoder communicating with the valve plate to provide electrical signals indicating a position of the valve plate.

7. The water diverter valve of claim 6 wherein the encoder provides a unique encoder signal at multiple different rotated positions of the valve plate to provide an absolute indication of valve plate position.

8. The water diverter valve of claim 7 wherein the coupling is an axial shaft form by threaded inter-engaging axially-displaced shaft portions and the encoder determines a rotation position of a shaft portion closest to the DC electric motor.

9. The water diverter valve of claim 1 wherein the inlet port includes a flow sensor.

10. The water diverter valve of claim 9 wherein the flow sensor is a turbine rotating with flow through the inlet port communicating with a turbine rotation sensor.

11. A water diverter valve for use in an appliance comprising;
a housing providing a water inlet and multiple water outlet ports;
a DC electric motor;
a valve plate rotatable about an axis and providing an orifice allowing water flow between the water inlet port and one of the multiple water outlet ports depending on a rotated position of the valve plate;
a coupling between the DC electric motor and the valve plate operating to move the valve plate in rotation with rotation of the DC electric motor to align the water inlet port with another one of the multiple water outlet ports and to move the valve plate axially toward and away from the multiple water outlet ports with rotation of the DC electric motor in a first and second direction; and
whereby the DC electric motor may rotate the valve plate and control its sealing against the multiple water outlet ports reducing leakage;
an encoder communicating with the valve plate to provide electrical signals indicating a position of the valve plate;
wherein the encoder provides;
a unique encoder signal at multiple different rotated positions of the valve plate to provide an absolute indication of valve plate position;
a set of movable electrical contacts rotating with the valve plate communicating with corresponding different stationary electric contacts on the housing and stationary with respect to the valve plate to provide a unique encoder system based on electrical communication between the movable and stationary electrical contacts.

12. A water diverter valve for use in an appliance comprising;
a housing providing a water inlet and multiple water outlet ports;
a DC motor;
a valve plate rotatable about an axis and providing an orifice allowing water flow between the water inlet port and one of the multiple water outlet ports depending on a rotated position valve plate;
a coupling between the DC electric motor and the valve plate operating to move the valve plate in rotation with rotation of the DC electric motor to align the water inlet port with another one of the multiple water outlet ports and to move the valve plate axially toward and away from the multiple water outlet ports with rotation of the DC electric motor in a first and second direction;
whereby the DC electric motor may rotate the valve plate and control its sealing against the multiple water outlet ports reducing leakage; and
a check valve positioned between the water inlet and the valve plate operating to be biased toward closure with water flow into the water inlet to the valve plate.

13. The water diverter valve of claim 12 wherein the valve plate provides cam elements communicating with the check valve to open the check valve with rotation of the valve plate such that the orifice is aligned with one of the multiple water outlet ports and to permit the check valve to close with rotation of the valve plate such that the orifice is between multiple water outlet ports.

14. The water diverter valve of claim 13 wherein the upstream valve element is biased toward closing absent interaction with the cam element by at least one of buoyancy and gravity.

15. A water diverter valve system providing water diverter valve for use in an appliance comprising:
(a) a water diverter valve having:
(i) a housing providing a water inlet and multiple water outlet ports;
(ii) a DC electric motor;
(iii) a valve plate rotatable about an axis and providing an orifice allowing water flow between the water inlet port and one of the multiple water outlet ports depending on a rotated position of the valve plate; and
(iv) a coupling between the DC electric motor and the valve plate operating to move the valve plate in rotation with rotation of the DC electric motor to align the water inlet port with different of the multiple water outlet ports and to move the valve plate axially toward and away from the multiple water outlet ports with rotation of the DC electric motor in a first and second direction;

(b) an upstream water valve positioned between the water inlet of the water diverter valve and a connection for receiving pressurized water; and (c) an electronic controller executing a stored program to:
(i) close the upstream water valve;
(ii) after closing of the upstream water valve, operating the DC motor to move the valve plate in rotation to a new position; and
(iii) open the upstream water valve;
wherein water pressure is removed from the valve plate allowing movement by the DC motor.

16. The water diverter valve system of claim 15 wherein the controller controls the DC electric motor to rotate the valve plate into alignment with successive of the multiple water outlet ports when the DC electric motor moves in the second direction.

17. The water diverter valve system of claim 15 wherein the controller, after closing the upstream water valve, operates the DC motor to move the valve plate axially away from the multiple water outlet ports and after operating the DC motor to move the valve plate in rotation to the new position, operates the DC motor to move the valve plate axially toward the multiple water outlet ports.

18. The water diverter valve system of claim 15 wherein during movement of the valve plate in rotation to the new position, the controller moves the valve plate to successive new positions including positions where the orifice is aligned with one of the multiple water outlet ports and positions where the orifice is between two of the multiple water outlet ports so that during opening of the upstream water valve, the orifice is aligned with one of the multiple water outlet ports for some positions and where the orifice is not aligned with one of the multiple outlet water ports for other positions sealing the multiple outlet water ports.

19. The water diverter valve of claim 15 further including a check valve positioned between the water inlet and the valve plate operating to be biased toward closure with water flow into the water inlet to the valve plate; and wherein the valve plate provides cam elements communicating with the upstream valve to open the check valve with rotation of the valve plate such that the orifice is aligned with one of the multiple water outlet ports and to permit the check valve to close with rotation of the valve plate such that the orifice is between multiple water outlet ports.

20. A water diverter valve for use in an appliance comprising:

a housing providing a water inlet and multiple water outlet ports;

a DC electric motor;

a valve plate rotatable about an axis and providing an orifice allowing water flow between the water inlet port and one of the multiple water outlet ports depending on a rotated position of the valve plate;

a coupling between the DC electric motor and the valve plate operating to move the valve plate in rotation with rotation of the DC electric motor to align the water inlet port with different of the multiple water outlet ports; and a check valve positioned between the water inlet and the valve plate operating to be biased toward closure with water flow into the water inlet to the valve plate.

* * * * *